US007703741B2

(12) United States Patent
Mack

(10) Patent No.: US 7,703,741 B2

(45) Date of Patent: Apr. 27, 2010

(54) DRIVE MECHANISM FOR A DOWN DRAFT VENT SYSTEM

(75) Inventor: Boris Mack, Kraichtal (DE)

(73) Assignee: BSH Bosch und Siemens Hausgeraete GmbH, Munich (DE)

(*) Notice: Subject to any disclaimer, the term of this patent is extended or adjusted under 35 U.S.C. 154(b) by 393 days.

(21) Appl. No.: 11/606,665

(22) Filed: Nov. 29, 2006

(65) Prior Publication Data

US 2007/0137636 A1 Jun. 21, 2007

(30) Foreign Application Priority Data

Dec. 16, 2005 (DE) ....................... 10 2005 060 356

(51) Int. Cl.
*F16K 31/02* (2006.01)

(52) U.S. Cl. ............................ 251/129.04; 251/129.11; 49/28

(58) Field of Classification Search ............ 251/129.04, 251/129.11, 129.12; 49/26, 28, 360, 362
See application file for complete search history.

(56) References Cited

U.S. PATENT DOCUMENTS 4,698,938 A * 10/1987 Huber ......................... 49/138
4,783,048 A * 11/1988 St. Clair ................ 251/129.11
6,118,243 A * 9/2000 Reed et al. .................. 318/468
6,181,095 B1 * 1/2001 Telmet ........................ 318/480
6,308,461 B1 * 10/2001 Hopson et al. ................. 49/28

FOREIGN PATENT DOCUMENTS

| | | |
|---|---|---|
| DE | 38 22 510 | 1/1990 |
| EP | 1 384 952 | 1/2004 |
| JP | 5-118601 | 5/1993 |

OTHER PUBLICATIONS

National Search Report DE 10 2005 060 356.4, Jun. 2007.

* cited by examiner

*Primary Examiner*—John K Fristoe, Jr.
(74) *Attorney, Agent, or Firm*—James E. Howard; Andre Pallapies

(57) ABSTRACT

The invention relates to a drive mechanism for a down draft vent system (8) comprising a retractable down draft vent screen (10) which can be moved between an extended and a retracted position by means of a drive motor (3). The drive mechanism (1) is characterized in that the drive motor (3) is a synchronous motor with a reversing circuit (31, 32, 7) for load-dependent reversal of the driving direction. The present invention can thus provide a safety function against jamming of objects since the drive motor (3) reverses automatically when the load is fairly large.

14 Claims, 3 Drawing Sheets

DRIVE MECHANISM FOR A DOWN DRAFT VENT SYSTEM

Figure 1:
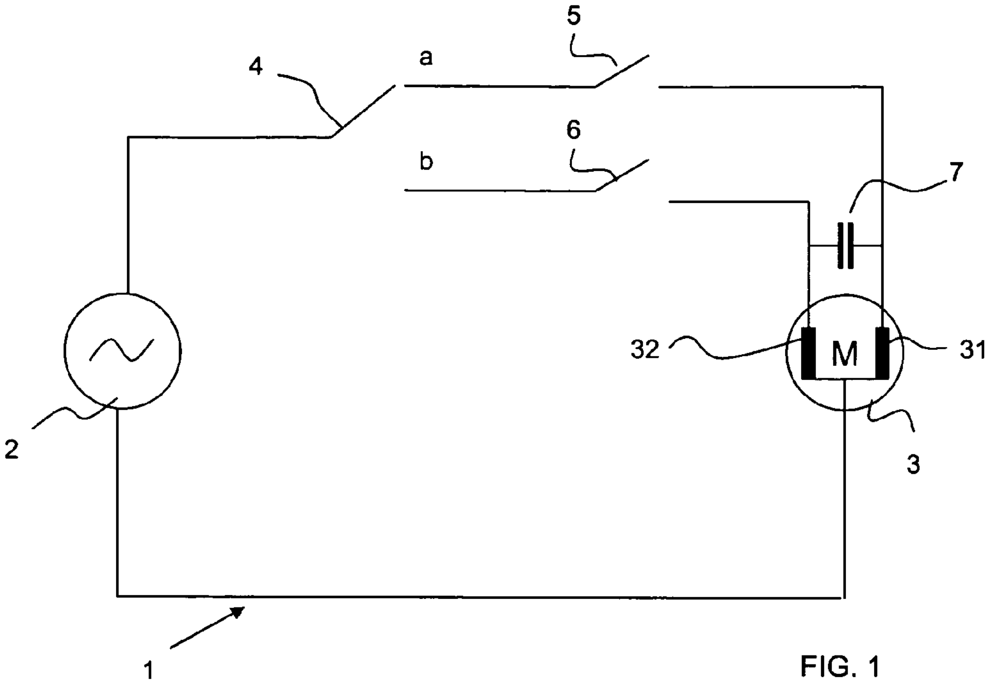

The present invention relates to a drive mechanism for a down draft vent system comprising a retractable down draft vent screen which can be moved between an extended position and a retracted position by means of a drive motor.

These down draft vent systems are known in particular for extracting odours and steam above a hob. The down draft vent systems can be used on so-called flat screen hoods or chimneys with a retractable screen. Described in EP 1 384 952 A1, for example, is a steam guiding apparatus in which a guide plate can be extended and retracted by means of a motor below a microwave appliance. The movement of the guide plate can be interrupted in this case by means of switches when the guide plate has reached one of its end positions. The switches are arranged so that these are actuated on reaching the end positions.

Furthermore, in the circuit for the steam guiding device according to the prior art there is provided a thermostat which activates relay switches in the circuit when a predetermined temperature is attained. The drive motor for the retractable guide plate can be actuated in the desired direction by means of these relay switches.

A disadvantage of the known device is that the motor is driven exclusively depending on the temperature or on reaching one of the end positions of the guide plate.

It is therefore the object of the present invention to provide a drive mechanism for a down draft vent screen of a down draft vent system in which the movement of the down draft vent screen can be controlled as a function of external conditions which can be independent of reaching the end position of the down draft vent screen and the prevailing temperature.

This object is achieved according to the invention by a drive mechanism for a down draft vent system comprising a retractable down draft vent screen which can be moved between an extended and a retracted position by means of a drive motor. The drive mechanism is characterised in that the drive motor is a synchronous motor with a reversing circuit for load-dependent reversal of the drive motor.

Since the direction of motion of the drive motor and therefore the direction of motion of the down draft vent screen is influenced by the load acting on the down draft vent screen, the drive mechanism according to the invention can implement a protective function which is not possible in the prior art. If the retractable down draft vent screen encounters an obstacle, this effects a reversal of the drive motor in the drive mechanism according to the invention and therefore moves the down draft vent screen back. This can provide protection against jamming of objects or jamming of the hand of the user of the down draft vent system. As a result of the reversal of the direction of motion of the drive motor and therefore the direction of motion of the down draft vent screen, any object which may be jammed for a short time is quickly released.

In addition, the use of a synchronous motor can ensure that even if the drive motor is blocked, it does not run hot and thus burn-out of the drive motor can be prevented.

Furthermore, if a synchronous motor is used, the down draft vent screen can be actuated mechanically in the event of any failure of the drive motor which may occur. In contrast to other geared motors, the resistance force required to move a synchronous motor is relatively low. In the event of a failure of the drive motor, the down draft vent screen can thus be retracted or extended by hand.

According to one embodiment of the present invention, the drive mechanism according to the invention has one drive motor which has two pairs of windings connected in parallel and at least one interrupt element in the supply line to the two pairs of windings.

Since the interrupt element is provided in the drive motor, the control of the drive motor or the control of the drive mechanism can be simply embodied. Thus, in particular the number of structural elements of the drive mechanism can be reduced. However, it is also possible to connect the interrupt element before the motor.

According to a preferred embodiment, the interrupt element in the drive motor is a capacitor. By using a capacitor, the load acting on the down draft vent screen can be taken into account in the drive motor in the driving of the at least two pairs of windings connected in parallel. By using a capacitor it is possible in particular to briefly interrupt the power supply to one of the pairs of windings and divert it to the other pair of windings. By this means it can be achieved that when the down draft vent screen encounters an obstacle, the drive motor in the drive mechanism briefly changes or reverses the direction of movement of the down draft vent screen. After the load has reduced, the drive motor can be operated further in the original direction of motion and the down draft vent screen thereby moved in the original direction of motion.

According to a preferred embodiment, the drive motor is an AC motor. By using an AC motor, a rectifier usually required in the prior art can be omitted. Nevertheless, the drive motor of the drive mechanism can be operated by mains voltage without it being necessary to interpose an additional circuit element.

According to a further embodiment, the movement of the down draft vent screen is accomplished by transmitting a driving force from the drive motor by means of at least one actuating element and that the at least one actuating element is spring-mounted in at least one direction of movement of the down draft vent screen.

Since a spring-mounted actuating element is inserted between the down draft vent screen and the drive motor, the down draft vent screen can be moved independently of the driving force of the drive motor to a certain extent. This independent movement of the down draft vent screen can prevent a load build-up in the drive motor when a small force is acting on the down draft vent screen. In this embodiment, reversal of the drive motor will therefore only take place in those cases where the force acting on the down draft vent screen causes a movement of the down draft vent screen which exceeds the distance which can be taken up by the spring mounting.

The actuating element can be fixed as desired by means of at least one spring on the down draft vent screen or on a fixed part of the down draft vent system. The springs are preferably provided so that this force can be taken up in at least one of the directions of movement of the down draft vent system. If the actuating element is secured by means of two spring elements on the down draft vent screen, a force acting on the extraction screen can be transmitted directly to one of the springs. If the actuating element is spring-mounted on a fixed part of the down draft vent system on the other hand, a force acting on the down draft vent screen is transmitted to the springs, for example, by means of a transmission element affixed to the down draft vent screen, for example, a pinion which cooperates with the actuating element, and the actuating element.

If the actuating element is fixed to the down draft vent screen by means of springs, a relative movement of the down draft vent screen with respect to the actuating element and thus to the drive motor can be implemented. As a result of the spring mounting of the actuating element on the down draft vent screen, the relative movement between the drive motor and the down draft vent screen can be damped. Since the spring mounting is provided in at least one of the directions of movement of the down draft vent screen, said down draft vent screen can be stopped or damped before reaching one of the end positions. This can protect the drive motor. Also during driving out from an end position, an abrupt loading of the motor can be avoided in the drive mechanism according to the invention. Also, in cases where the down draft vent screen encounters an obstacle between the end positions, the interposed actuating element, which is spring-mounted can take up a predetermined load before a build-up of load takes place in the drive motor, in particular in a capacitor provided therein or connected in front thereof, and thus brings about a switching of the direction of movement of the drive motor.

According to a further embodiment, the down draft vent screen is horizontally aligned. In this embodiment, the synchronous motor used according to the invention can function in a similar manner in both directions of motion of the down draft vent screen. In this embodiment, the force of gravity which would need to be taken into account with a vertical alignment can be neglected so that it is possible to have a symmetrical structure in which the same force transmission elements such as, for example, springs on an actuating element can be used for both directions of motion of the down draft vent screen.

According to a further embodiment, the drive mechanism according to the invention can have at least two interrupt switches which are actuated via the actuating element. The interrupt switches are used to interrupt the power supply to the drive motor. Since the interrupt switches are actuated by the actuating element, which is spring-mounted, the power supply to the drive motor can be implemented depending on the force acting on the down draft vent screen. This force is transmitted via the springs of the mounting of the actuating element. The drive motor can thus be switched off, for example, when the down draft vent screen encounters an obstacle. In this way, it is possible to also switch off the drive motor in positions of the down draft vent screen in which said screen has not yet reached any of the end positions. Such a switch-off cannot be achieved in devices according to the prior art in which the switches are fixed to a fixed part and are actuated via the down draft vent screen or devices connected firmly to said screen.

The interrupt switches are preferably fixed to the component of the extraction system to which the actuation element is spring-mounted. For example, the interrupt switches are fixed to the moving down draft vent screen.

The at least one switch on the down draft vent screen preferably engages in a recess on the actuating element having inclined planes provided at its end. By providing inclined planes on the contact surface via which the at least one switch is in contact or can be brought into contact with the actuating element, actuating arms on the at least one switch can be moved and the switch can thereby be opened or closed. The switching hysteresis can be optimised by the distance of the inclined plane from the actuating arms of the switch in the unloaded state of the down draft vent screen. Self-inhibition of the drive motor and the choice of a low spring rate can prevent retraction of the rack beyond the switching point of the switch.

Figure 2:
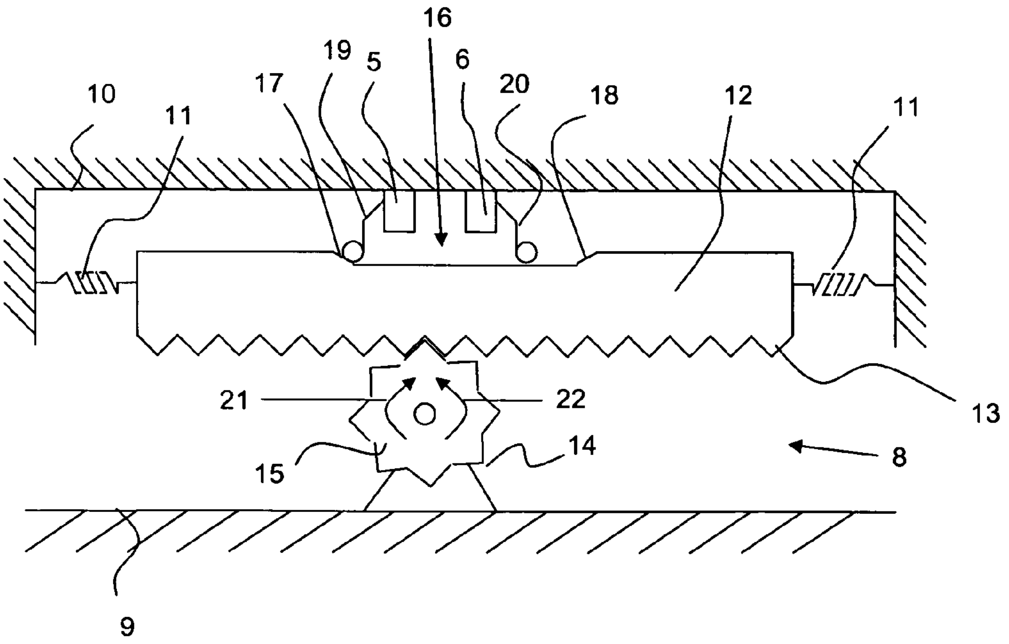
Figure 3A:
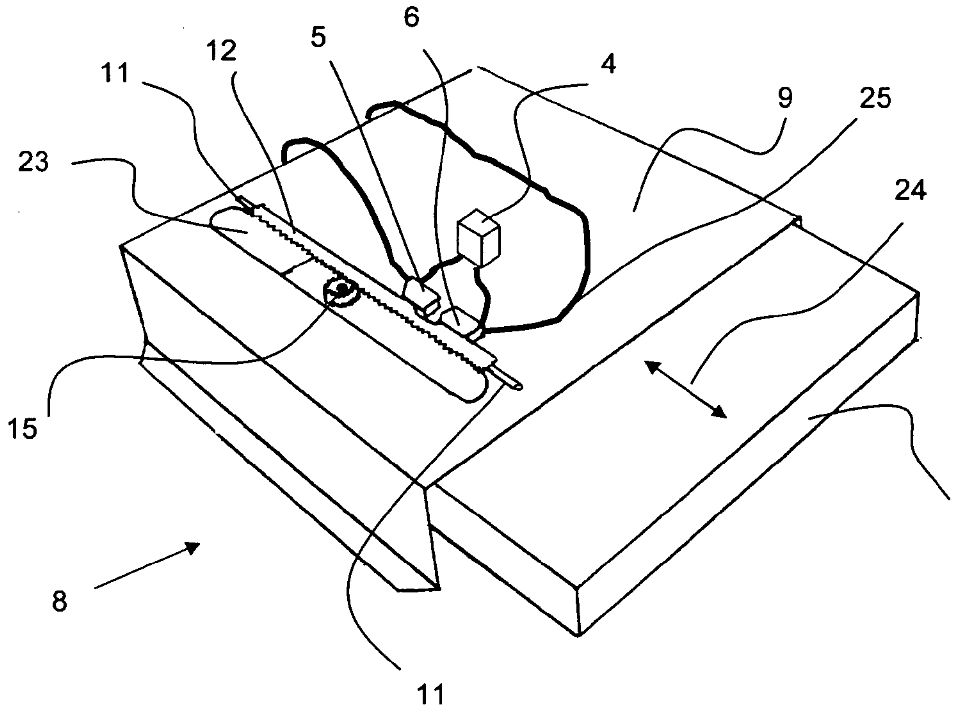
Figure 3B:
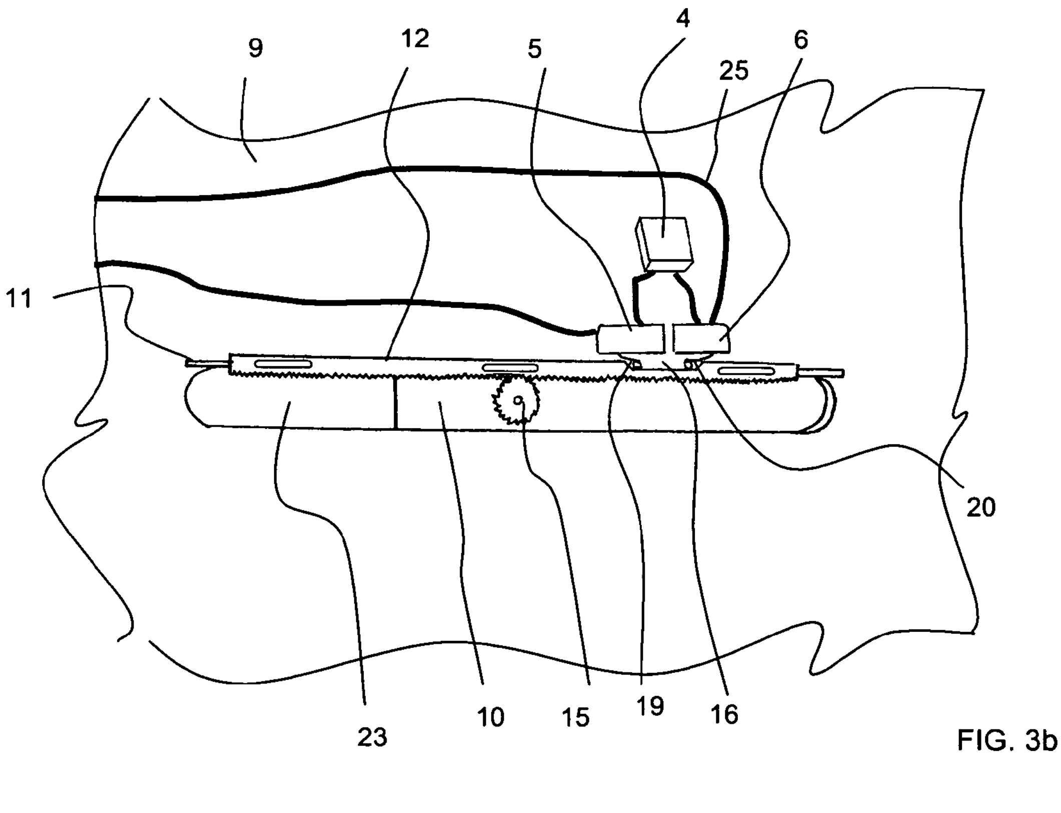
Figure 4:
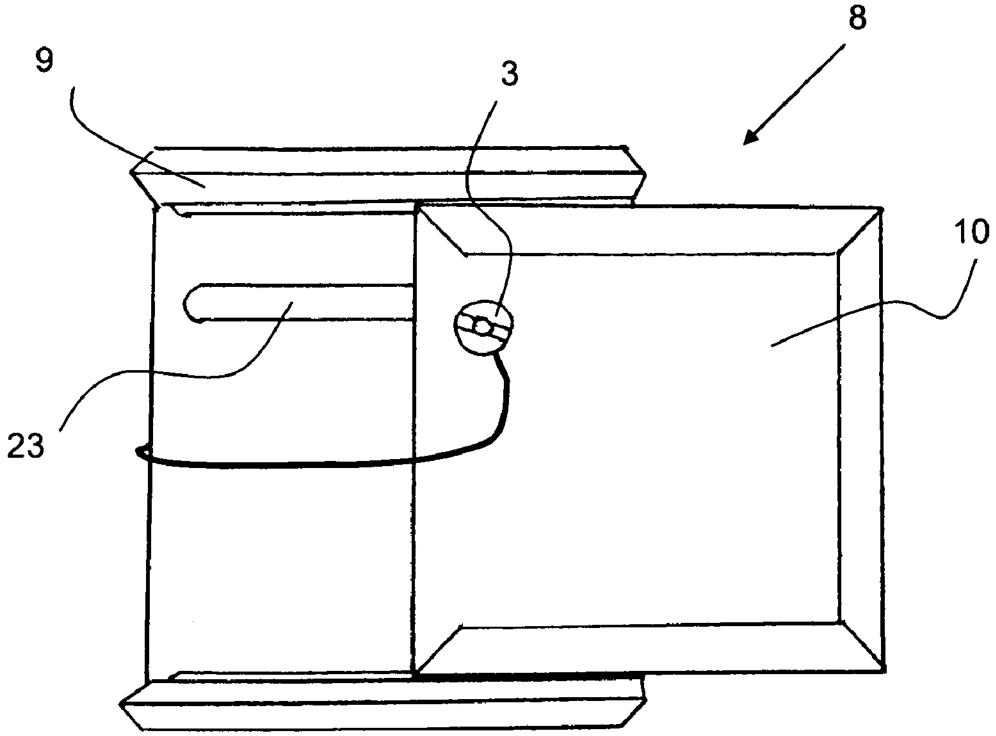

The present invention is explained again hereinafter with reference to the appended drawings. In the figures:

FIG. 1: is a schematic circuit diagram of an embodiment of the drive mechanism according to the invention;

FIG. 2: is a schematic functional diagram of an embodiment of the down draft vent system;

FIGS. 3*a* and 3*b*: show a schematic perspective view of a down draft vent system with a drive mechanism according to the invention and a detailed view of the drive mechanism; and FIG. 4: is a view from below of a down draft vent system with a drive mechanism according to the invention.

As can be deduced from FIG. 1, the drive mechanism 1 substantially comprises a voltage source 2 and a drive motor 3. The voltage source 2 is an AC voltage source. Interposed between the voltage source 2 and the drive motor 3 is a first switch 4 by which means the drive motor 3 can be supplied with the necessary operating voltage via the switching path a or the switching path b. When the connection is made via the switching path a, the motor turns in the opposite direction to the direction of rotation which it exhibits when supplied via the switching path b. Interposed in the switching path a between the voltage source 2 and the drive motor 3 is a first limit switch 5 which is a normally closed contact or an interrupt switch. Provided in switching path b is a second limit switch 6 which is likewise a normally closed contact or interrupt switch.

Between the switching paths a and b, a capacitor 7 is provided between the limit switches 5 or 6 and the drive motor 3. The capacitor 7 can also be integrated in the drive motor 3. As a result of this interconnection pattern or current path, the power supply to the drive motor 3 can thus be interrupted via the limit switches 5 or 6 and when the load increases, the power supply can be transferred from one switching path a, b to the other switching path b via the capacitor 7, causing the direction of rotation of the drive motor 3 to change, that is the direction of rotation is reversed. Since a capacitor 7 is also used as an interrupt element, the reversal of the direction of rotation of the drive motor 3 is cancelled again after the load has reduced. The direction of rotation is changed by changing the drive from one pair of windings 31 to the other pair of windings 32 in the drive motor 3.

FIG. 2 is a schematic diagram of the function of one embodiment of the down draft vent system 8. The down draft vent system 8 consists of a fixed part 9 which can in particular be a guide of a movable part 10. The movable part (10) is hereinafter also designated as down draft vent screen. An actuating element comprising a rack 12 is fixed on the down draft vent screen 10 by means of spring elements 11. The spring elements 11 are provide at the ends of the rack 12 and allow a horizontal movement of the rack 12 with respect to the down draft vent screen 10 in the position shown. The teeth 14 of a pinion 15 engage in the teeth 13 of the rack 12. The pinion 15 is rotatably mounted on the fixed part 9 of the down draft vent system 8. A recess 16 is incorporated in the rack 12 on the side of the rack 12 opposite to the side on which the teeth 13 are provided. At the lateral ends, said recess 16 has inclined planes 17, 18. Two actuating arms 19 and 20 of limit switches 5 and 6 which are affixed to the down draft vent screen 10 engage in the recess 16. During a relative movement of the rack towards the down draft vent screen 10, the switch 5 or the switch 6 are actuated as a result of the actuating arm 19 reaching the inclined plane 17 or the actuating arm 20 reaching the inclined plane 18. The drive motor (not shown in FIG. 3) is switched off by actuating one of the limit switches 5 or 6.

The drive motor 15 is connected to the pinion 15 and drives this depending on its directions of rotation in the schematic diagram in the clockwise or anticlockwise direction. These movements are indicated by the arrows 21 and 22 in FIG. 2.

If the pinion 15 is turned in the clockwise direction, that is in the direction of the arrow 21, this moves the rack 12 to the right. The down draft vent screen 10 is also pushed to the right via the right-hand spring 11. As a result of this movement, the down draft vent screen 10 can be extended for example. If the down draft vent screen 10 encounters an obstacle (not shown) during this extension movement, which for example can be an end stop for marking the end position of the down draft vent screen 10 or an object or a finger jammed between an object and the down draft vent screen 10, the movement of the down draft vent screen 10 will be stopped. The drive motor initially drives the pinion 15 further in the direction 21. This causes a relative displacement of the rack 12 with respect to the down draft vent screen 10 and the right-hand spring 11 is compressed. As a result of the relative displacement of the rack 12 in relation to the down draft vent screen 10, the actuating arm 19 of the limit switch 5 moves in the recess 16 towards the inclined plane 17. On reaching the inclined plane 17, the actuating arm 19 is moved and consequently actuates the switch 5. This interrupts the power supply to the drive motor 3 and the drive motor 3 is switched off.

When the obstacle is removed, the relative displacement of the rack 12 towards the down draft vent screen 10 can be undone as a result of the spring force of the spring 11 and the switch 5 is deactivated, that is, the drive motor 3 is again supplied with voltage and the down draft vent screen 10 can be extended further.

If a short-circuit occurs and the drive motor 3 is not switched off despite the existing obstacle, as a result of the capacitor 7 provided in the circuit of the drive mechanism 1 of the down draft vent system 8, the direction of rotation of the drive motor 3 is briefly reversed until the load has reduced, that is, the obstacle is no longer present.

During a movement of the down draft vent screen 10 in the opposite direction, that is, during a rotation of the pinion 15 in the direction 22 and therefore a retraction of the down draft vent screen 10, the drive motor 3 will be switched off or the direction of rotation of the drive motor 3 will be briefly reversed on encountering an obstacle in a corresponding fashion. In this case, the actuating arm 18 of the switch 6 will be actuated via the inclined plane 16 to switch off the drive motor 3.

An AC geared motor 3 is used to drive the pinion 15. Retraction of the rack 12 beyond the switching point of the switches 5 and 6 is prevented by self-inhibition of the gear used and a correspondingly low spring rate of the springs 11 used. The switching hysteresis thus ensured can be further optimised by the largest possible distance between the switches 5 or 6 and the inclined planes 17 and 18.

As can be seen from FIGS. 3*a* and 3*b*, the arrangement according to the invention can be implemented differently from the schematic diagram in FIG. 2 in such a manner that the pinion 15 is rotatably mounted on the movable part of the down draft vent system 8, that is on the down draft vent screen 10. In this embodiment, the rack 12 is fixed by means of springs 11 to the fixed part 9 of the down draft vent system 8, in particular, a screen guide which can be connected to the housing of an extractor hood.

The pinion 15 is horizontally disposed on the upper side of the down draft vent screen 10. As can be seen in FIG. 4, the synchronous motor 3 which is driven via the pinion 15 is disposed on the underside of the down draft vent screen 10. In this case, the shaft of the drive motor 3 extends through the down draft vent screen 10.

An elongated groove 23 through which the pinion 15 engages is provided in the screen guide 9. The groove 23 extends parallel to the direction of retraction or extension of the down draft vent screen 10 which is indicated by the arrow 24 in FIG. 3*a*. On one longitudinal side of the groove 23, the rack 12 is provided on the upper side of the screen guide 9. The teeth 13 of the rack 12 are facing the groove 23. The pinion 15 can thereby engage with the teeth 13 of the rack 12. The limit switches 5 and 6 are arranged on the side of the rack 12 facing away from the groove 23. As can be seen from the detailed view in FIG. 3*b*, the actuating arms 19 and 20 of the switches 5 and 6 engage in a recess 16 on the side of the rack 12 facing the switches 5 and 6.

FIGS. 3*a* and 3*b* also show the switch 4 for switching between the directions of rotation of the drive motor 3 and therefore for switching between the directions of motion of the down draft vent screen 10. This is likewise fixed to the screen guide 9. In the embodiment shown, the connection of the switches 4, 5 and 6 to the drive motor 3 is indicated schematically by cable 25 which leads from the upper side of the screen guide 9 to the drive motor 3 provided on the underside of the down draft vent screen 10. The switch 4 can, for example, be operated by the user of the down draft vent system 8 using a control element (not shown) which can be attached to the front side of the down draft vent screen 10.

The present invention is not restricted to the embodiment shown. In particular, the drive mechanism according to the invention can also be operated in a down draft vent system 8 in which the drive motor is switched off by limit switches which are provided in the end positions of the down draft vent screen. In this embodiment, the safety function which prevents the jamming of fingers, for example, is ensured exclusively by the automatic reversal of the drive motor under an increased load.

The present invention can thus ensure an end position switch-off of the down draft vent screen as well as a resistance switch-off of the down draft vent screen. The embodiment of the drive mechanism according to the invention provides additional safety from jamming of objects. In the event of a short circuit when an object is jammed at the down draft vent screen, the motor will automatically reverse under fairly high load as a result of the capacitor provided. Safety from burn-out of the motor is also ensured since the synchronous motor does not reach an excessively high temperature even when this is blocked. Finally, the spring-mounted rack ensures gentle starting of the drive motor from the end positions or into the end position of the down draft vent screen.

The drive mechanism according to the invention thus saves on expensive electronics which are required in the prior art by current limit switching and end switching solutions. Furthermore, a rectifier required in the case of a DC motor is also superfluous.

The invention claimed is:

1. A drive mechanism for a down draft vent system, the down draft system having a retractable down draft vent screen movable between an extended position and a retracted position by means of a drive motor, the drive mechanism comprising:

a synchronous drive motor having a shaft, the synchronous drive motor being operable to rotate the shaft in a selected direction and the shaft being operatively couplable to a retractable down draft vent screen for driving movement of the retractable down draft vent screen between an extended position and a retracted position, the synchronous motor including a reversing circuit for load-dependent reversal of the driving direction of the retractable down draft vent screen via rotation of the shaft in one direction for extension of the retractable down draft vent screen and rotation of the shaft in an opposite direction for retraction of the retractable down draft vent screen.

2. The drive mechanism according to claim 1, wherein the synchronous drive motor includes two pairs of windings connected in parallel and at least one interrupt element in the supply line to the two pairs of windings.

3. The drive mechanism according to claim 2, wherein the interrupt element is a capacitor.

4. The drive mechanism according to claim 1, wherein the synchronous drive motor is an AC motor.

5. The drive mechanism according to claim 1 and further comprising at least one actuating element, the at least one actuating element being operable to transmit a driving force from the synchronous drive motor to thereby effectuate driving movement of the down draft vent screen and the at least one actuating element is spring-mounted in at least one direction of movement of the down draft vent screen.

6. The drive mechanism according to claim 5, wherein the actuating element is fixed to the down draft vent screen by means of at least one spring.

7. The drive mechanism according to claim 5 and further comprising two interrupt switches actuated by means of the at least one actuating element.

8. The drive mechanism according to claim 7, wherein the interrupt switches are fixed to the component of the down draft vent system on which the at least one actuating element is spring-mounted.

9. The drive mechanism according to claim 8, wherein the at least one actuating elements has inclined planes at its ends and a recess and the at least one of the interrupt switches engages in the recess on the at least one actuating elements.

10. The drive mechanism according to claim 1, wherein the down draft vent screen is horizontally aligned and the synchronous drive motor is operable to drive the retractable down draft vent screen horizontally between its extended position and its retracted position.

11. The drive mechanism according to claim 1, wherein the drive mechanism, upon the occurrence of a predetermined condition, causes the reversing circuit to effect a reversal of the driving direction of the retractable down draft vent screen and the predetermined condition is a condition other than a change in a load characteristic of the drive motor.

12. The drive mechanism according to claim 11, wherein the predetermined condition detected by the drive mechanism is a condition other than an increase in the drive motor voltage.

13. The drive mechanism according to claim 11 and further comprising at least one actuating element, the at least one actuating element being coupled to the synchronous drive motor and coupled to the down draft vent screen for transmitting a driving force from the synchronous drive motor to the down draft vent screen to thereby effectuate driving movement of the down draft vent screen, the at least one actuating element is coupled to the down draft vent screen in a manner such that, when the down draft vent screen encounters an object that prevents further movement of the down draft vent screen along the respective existing direction of movement, the at least one actuating element continues to be driven by the synchronous drive motor through a limited range of movement, and the at least one actuating element, as it moves through the limited range of movement, actuates the reversing circuit to reverse the direction of movement of the down draft vent screen.

14. The drive mechanism according to claim 1 and further comprising at least one actuating element, the at least one actuating element being coupled to the synchronous drive motor and coupled to the down draft vent screen for transmitting a driving force from the synchronous drive motor to the down draft vent screen to thereby effectuate driving movement of the down draft vent screen, the at least one actuating element is coupled to the down draft vent screen in a manner such that, when the down draft vent screen encounters an object that prevents further movement of the down draft vent screen along the respective existing direction of movement, the at least one actuating element continues to be driven by the synchronous drive motor through a limited range of movement, and the at least one actuating element, as it moves through the limited range of movement, actuates the reversing circuit to reverse the direction of movement of the down draft vent screen.

* * * * *